(12) United States Patent
Arora et al.

(10) Patent No.: US 9,055,393 B2
(45) Date of Patent: Jun. 9, 2015

(54) NEAR FIELD COMMUNICATION DATA TRANSFER

(71) Applicant: Hewlett-Packard Development Company, L.P., Fort Collins, CO (US)

(72) Inventors: Puneet Kumar Arora, New Delhi (IN); Vijaykumar Nayak, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

(21) Appl. No.: 13/857,114

(22) Filed: Apr. 4, 2013

(65) Prior Publication Data

US 2014/0302785 A1      Oct. 9, 2014

(51) Int. Cl.
 *H04B 5/00* (2006.01)
 *H04W 4/00* (2009.01)
 *H04W 12/08* (2009.01)

(52) U.S. Cl.
 CPC .............. *H04W 4/008* (2013.01); *H04W 12/08* (2013.01)

(58) Field of Classification Search
 USPC ................................ 455/41.1, 41.2; 340/10.1
 See application file for complete search history.

(56) References Cited

U.S. PATENT DOCUMENTS

| 8,639,291 | B1* | 1/2014 | Gailloux et al. | 455/558 |
|---|---|---|---|---|
| 2009/0298426 | A1* | 12/2009 | Helvick | 455/41.1 |
| 2010/0075666 | A1 | 3/2010 | Garner | |
| 2010/0112941 | A1* | 5/2010 | Bangs et al. | 455/41.1 |
| 2010/0198032 | A1* | 8/2010 | Simpson et al. | 600/365 |
| 2011/0215921 | A1* | 9/2011 | Ben Ayed et al. | 340/539.11 |
| 2012/0077433 | A1* | 3/2012 | Walker et al. | 455/41.1 |
| 2012/0150601 | A1 | 6/2012 | Fisher | |
| 2012/0178367 | A1 | 7/2012 | Matsumoto et al. | |
| 2014/0113551 | A1* | 4/2014 | Krishnan et al. | 455/41.1 |

FOREIGN PATENT DOCUMENTS

WO    WO-2012109696 A1    8/2012

OTHER PUBLICATIONS

Rashvand, et al.; "Ubiquitous Wireless Telemedicine", < http://ieeexplore.ieee.org/stamp/stamp.jsp?arnumber=4479518 > On pp. 237-254; vol. 2; Issue: 2, Feb. 2008.

* cited by examiner

*Primary Examiner* — Nguyen Vo
(74) *Attorney, Agent, or Firm* — Hewlett-Packard Patent Department

(57) ABSTRACT

A device includes a near field communication (NFC) module that stores data and a list of devices authorized to receive the data. A request for the data is received at the NFC module from a second device while the device is operating in a first mode. The data is transferred from the NFC module to the second device using NFC communications protocol based on a determination that the second device is an authorized device.

17 Claims, 5 Drawing Sheets

NEAR FIELD COMMUNICATION DATA TRANSFER

BACKGROUND

Advances in technology have made it possible for users to easily share content from their mobile devices. For example, a user may share movies, music, documents, and pictures with other users via a wireless interface of a mobile device within seconds. Advances in technology have resulted in mobile devices that facilitate effortless exchange of content and information between mobile devices.

BRIEF DESCRIPTION OF THE DRAWINGS

The following detailed description references the drawings, wherein.

DETAILED DESCRIPTION

Figure 1:
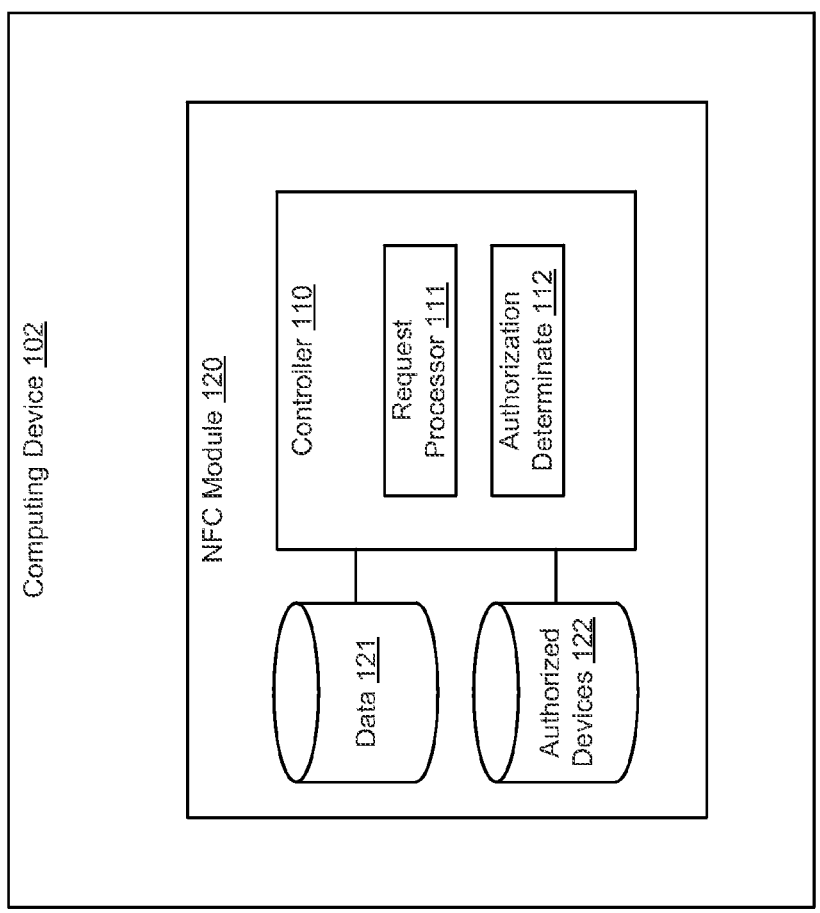
FIG. 1 is a block diagram of a device with an NFC module to securely transfer data, according to one example.

Various aspects of the present disclosure are directed to the secure transfer of data using near field communication (NFC). More precisely, various aspects of the present disclosure are directed to securely transferring data from a first device that is operating in a first mode (e.g., offline, low power, sleep mode, or power off mode) to a second device requesting the data using NFC standards, where the second device is pre-authorized or known to the first device.

Devices such as smartphones and other mobile devices include wireless interfaces for communicating with other devices, base stations, and access points. The devices may include one or more wireless radios to enable wireless communications. Examples of such wireless radios include Bluetooth, Wi-Fi, cellular, and NFC. Some wireless radios consume a significant amount of a device's power. For example, Wi-Fi, cellular, and Bluetooth radios consume considerably more power than an NYC radio. Moreover, certain wireless radios may not be enabled when the device has a low power. Accordingly, when the device is offline or operating in a low power mode, the user may not be able to transfer data to other devices.

In an offline mode or in a low power mode, the NFC radio of a device may be enabled to execute/perform data transfer. Thus, the low power capabilities of the NFC standard may be used to transfer data when the device is offline/powered off, operating in a low power mode, or a sleep mode. However, in the low power mode or the offline mode, a user may wish to transfer data only to known (or authorized) devices. Accordingly, examples disclosed herein provide a solution for sharing data between devices operating in an offline and/or low power mode in a secure manner. Thus, data may be transferred between the devices even when a user interface of the transferring device, for example, cannot be initiated. Data may be designated as important and stored in an NFC module of the first device so that even when the first device is "OFF," the data may still be transferred securely (e.g., to a pre-authorized or "known" second device).

In one example, a device includes an NFC module comprising a controller to store data and a list of devices authorized to receive the data. The controller is also to receive a request for the data from a second device when the device is operating in a first mode. The controller is further to transfer the data from the NFC module to the second device using NFC communications protocol based on a determination that the second device is an authorized device.

In another example, a method of securely transferring data includes storing data and a list of devices authorized to receive the data on an NFC module of a device. The method includes maintaining power to the NFC module and disabling power to a wireless radio of the device when the device is operating in a first mode. The method also includes receiving a request for the data from a second device and retrieving and transferring the data from the NFC module to the second device via NFC communication protocol responsive to determining that the second device is authorized.

In another example, a non-transitory computer-readable medium includes instructions that, when executed by an NFC module of a device, cause the NFC module to store data and a list of devices authorized to receive the data. The instructions are further executable to receive a request for the data from a second device when the device is operating in a first mode, where power to the NFC module is maintained when the device is operating in the first mode. The instructions are executable to transfer the data from the NFC module to the second device via NFC communications protocol based on a determination that the second device is authorized.

As used herein, the term "near field communication" and "NFC" are defined as including, but are not necessarily limited to, a technology for devices to establish communication with each other by touching them together or bringing them into close proximity (e.g., a distance of approximately four (4) centimeters (cm) or less). This communication can be encrypted or unencrypted. This communication may also be established over radio frequencies (e.g., 1156 megahertz (MHz) on an ISO/IEC 18000-3 air interface) and at varying data rates (e.g., 106 Kbits/sec to 424 Kbits/sec). NFC devices can engage in two-way communication with one another, as well as one-way communication with NFC data tags. Portions of NFC technology have been approved as standards (e.g., ISO/TEC 18092/ECMA-340 and ISO/IEC 21481/ECMA-352).

As used herein, "NFC communications protocol" is defined as including, but not necessarily limited to, a format, syntax, and signaling arrangement utilized to transmit/receive data between devices and/or an NFC tag. For example, NFC communications protocol may include a "passive communication mode" and an "active communication mode." In the passive communication mode, an initiator device provides a carrier field that a target device answers by modulating the existing field. In this mode the target device may draw its operating power from the initiator-provided electromagnetic field, thus making the target device a transponder. In the active communication mode, both initiator and target devices communicate by alternately generating their own fields. A device deactivates its RE field while waiting for data. In this mode, both devices typically have power supplies.

As used herein, a device is "online" when the device is powered on or in an operational mode, and the device is "offline" when the device is operating in at least one of a low power mode, a power off mode (e.g., turned off), and a sleep mode, where there is limited or no power to the device.

As used herein, the term "wireless radio communications protocol" is defined as including, but is not necessarily limited to, a format, syntax, and signaling arrangement utilized to transmit/receive data to and from other devices that include one or more "wireless radios," (e.g., Bluetooth radio, 802.11 radio, and cellular radio).

FIG. 1 depicts a block diagram of a device with an NFC module to securely transfer data, according to one example. Device 102 may be, for example, a tablet, a smartphone, cellular device, a personal digital assistant (FDA), an all-in-one (AIO) computing device, a notebook, a convertible or hybrid notebook, a netbook, a laptop, or another portable computing device. Device 102 includes an NFC module 120. NFC module 120 includes a controller 110. NFC module 120 may communicate data transmit/receive) via NFC communications protocol.

Controller 110 may be, for example, a general purpose processor, an application specific integrated circuit (ASIC), or another type of controller. Controller 110 may store data 121 and a list of authorized devices 122 that are authorized to receive the data 121. Data 121 may include content (e.g., movies, pictures, music, etc), documents, text, contacts, and so on. When the device 102 is operating in an offline mode (e.g., a low power mode, a power off mode, and a sleep mode), power may be maintained at the NFC module 120. Accordingly, the NFC module 120 can operate when little or no power is available to the device 102. Authorized devices 122 include devices that are known to device 102 and that are permitted to receive data 121 from device 102. For example, a user of device 102 may designate other user devices that may receive data 121 from the user. Such devices may have been previously authenticated and/or pre-authorized by device 102. To illustrate, the requesting device may have been pre-authenticated via a Bluetooth authentication process password verification) while communicating via Bluetooth. Accordingly, device 102 is able to recognize the requesting device in future transactions/communications.

The controller 110 includes a request processor 111 and an authorization determinate 112. Request processor 111 is to receive a request for the data 121 from a second device when the device 102 is operating in a first mode. As described above, the first mode may include at least one of a low power mode, a power off mode, and a sleep mode. Thus, in one example, the second device may request data 121 from the device 102 when the device 102 is powered off. Authorization determinate 112 is to determine whether the second device is authorized according to the list of authorized devices 122. If the second device is determined to be an authorized device, controller 110 may transfer the data 121 from the NFC module 120 to the second device. For example, the controller 110 may initiate the transfer using NFC communication protocols. NFC communication protocols may include at least one of an active communication mode and a passive communication mode. In the passive communication mode, for example, the second device may supply power to the NFC module 120 to enable the data transfer.

Figure 2:
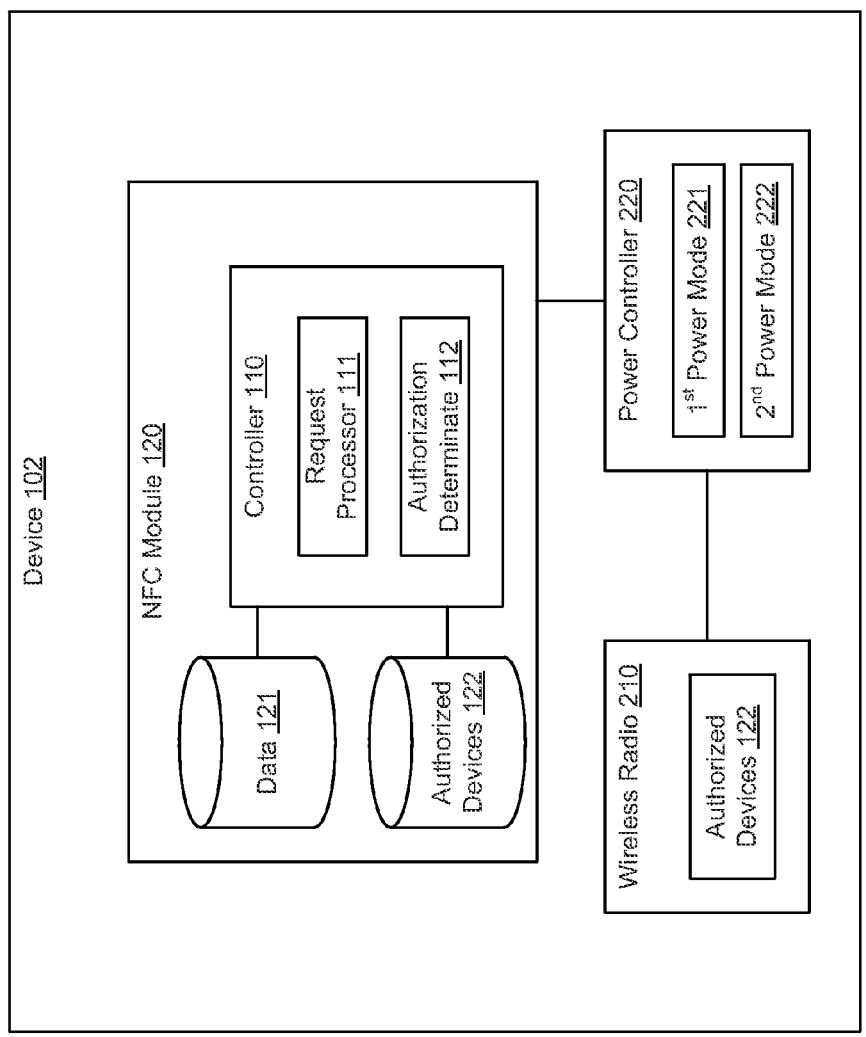
FIG. 2 is a block diagram of a device with an NFC module to securely transfer data, according to one example.

FIG. 2 depicts a block diagram of a device with an NFC module to securely transfer data, according to one example. In the example of FIG. 2, device 102 includes NFC module 120. NFC module 120 includes controller 110. Device 102 also includes wireless radio 210 and power controller 220.

Power controller 220 is to control power to the wireless radio 210 and to the NFC module 120. Power controller 220 may control power to the wireless radio 210 and the NFC module 120 when the device 102 is operating in different modes. In some examples, when the device 102 is operating in a first mode 221 (e.g., offline mode), power to the wireless radio 210 is disabled while power to the NFC module 120 is enabled. Accordingly, in the first mode 221, data 121 may only be transferred from the NFC module 120 to the second device requesting the data 121. To illustrate, for example, in the first mode, the wireless radio 210 (e.g., Bluetooth radio) may not be able to initiate transfer of the data 121 to the second device either because battery level of the device 102 is low or the battery of the device 102 is drained.

Moreover, in the first mode 221, a user interface of the device 102 for executing secure transfer of the data 121 may not be initiated due to the low/drained battery power. However, due to the availability of data 121 and the list of authorized devices 122 on the NFC module 120 and because power is maintained/provided to the NFC module 120 during the first mode, secure transfer of the data 121 is possible. In certain examples, when the device 102 is operating in the first mode 221, power may be provided to the NYC module 120 by the second device requesting the data 121. In such an example, the device 102 uses a passive NFC communication mode, where the NFC module 120 draws its operating power from power provided by the second device. It should be noted however that data 121 transfer from the device 102 to the second device may still be possible when both devices are powered off.

In other examples, when the device 102 is operating in the second mode 222 (e.g., operational or online mode), power is enabled to both the wireless radio 210 and the NFC module 120. Accordingly, in the second mode 222, devices may be authorized (e.g., via Bluetooth authentication) and the list of authorized devices 122 may be transferred from the wireless radio 210 to the NFC module 120 for secure transfer when the device 102 is operating in the first mode 221.

In certain examples, the request for data 121 may be received from the second device when the device 102 is operating in the second mode (i.e., online or operational mode). However, the device 102 may switch to the first mode (i.e., offline or power off mode), for example, when the battery level of the device 102 is low or drained. In this example, the data 121 may initially be transferred from the wireless radio 210 to the second device (e.g., via Bluetooth or Wi-Fi protocol). However before the transfer is complete, the device 102 may become powered down to the amount of power consumed by the wireless radio. When this occurs, device 102 may switch to the NFC communication protocol where the second device is first verified to be an authorized device based on the list 122, and then data 121 is transferred from the NFC module 120 to the second device.

Figure 3:
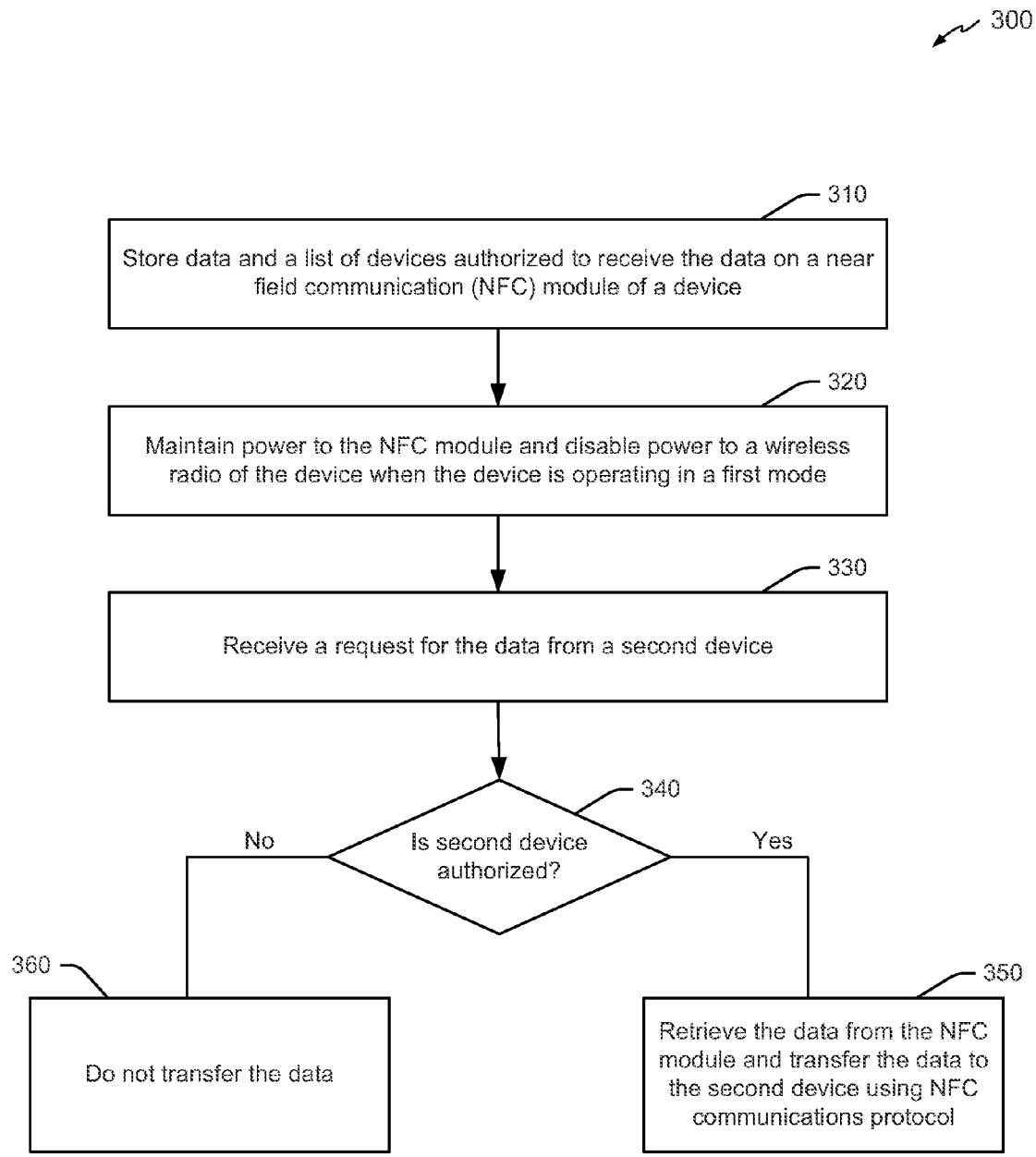
FIG. 3 is a flowchart of a method of securely transferring data, according to one example.

FIG. 3 is a flowchart of a method 300 of securely transferring data, according to one example. Although execution of method 300 is described below with reference to the components of device 102, other suitable components for execution of method 300 will be apparent to those of skill in the art. Additionally, the components for executing method 300 may be spread among multiple devices. Moreover, method 300 may be implemented in the form of executable instructions stored on a machine-readable storage medium, such as non-transitory machine-readable storage medium 510 of FIG. 5, and/or in the form of electronic circuitry.

Method 300 includes storing data and a list of devices authorized to receive the data on an NFC module of a device, at 310. For example, data 121 and authorized devices 122 may be stored on NFC module 120 of device 102 to enable transfer of the data 121 to an authorized device when device 102 is offline or powered off/down. Data 121 may include content, documents, files that may be important to transfer from device 102 even while device 102 is OFF.

Method 300 includes maintaining power to the NFC module and disabling power to a wireless radio of the device when the device is operating in a first mode, at 320. For example, power controller 220 may disable power to wireless radio 210 and enable power to NFC module 120 when the device 102 is operating in an offline mode (e.g., power down, low power, or sleep modes).

Method 300 includes receiving a request for the data from a second device, at 330. For example, a second device may send a request for the data 121 to the device 101 while the device 102 is in the first mode.

Method 300 includes determining whether the second device is authorized, at 340, For example a determination is made whether the second device is in the list of authorized devices 122. If it is determined that the second device is authorized, method 300 includes retrieving the data from the NFC module and transferring the data to the second device via NFC communications protocols, at 350. For example, the data 121 may be transferring using at least one of an NFC passive communication mode and an NFC active communication mode. If it is determined that the second device is not authorized, method 300 includes not transmitting the data to the second device, at 360.

Figure 4:
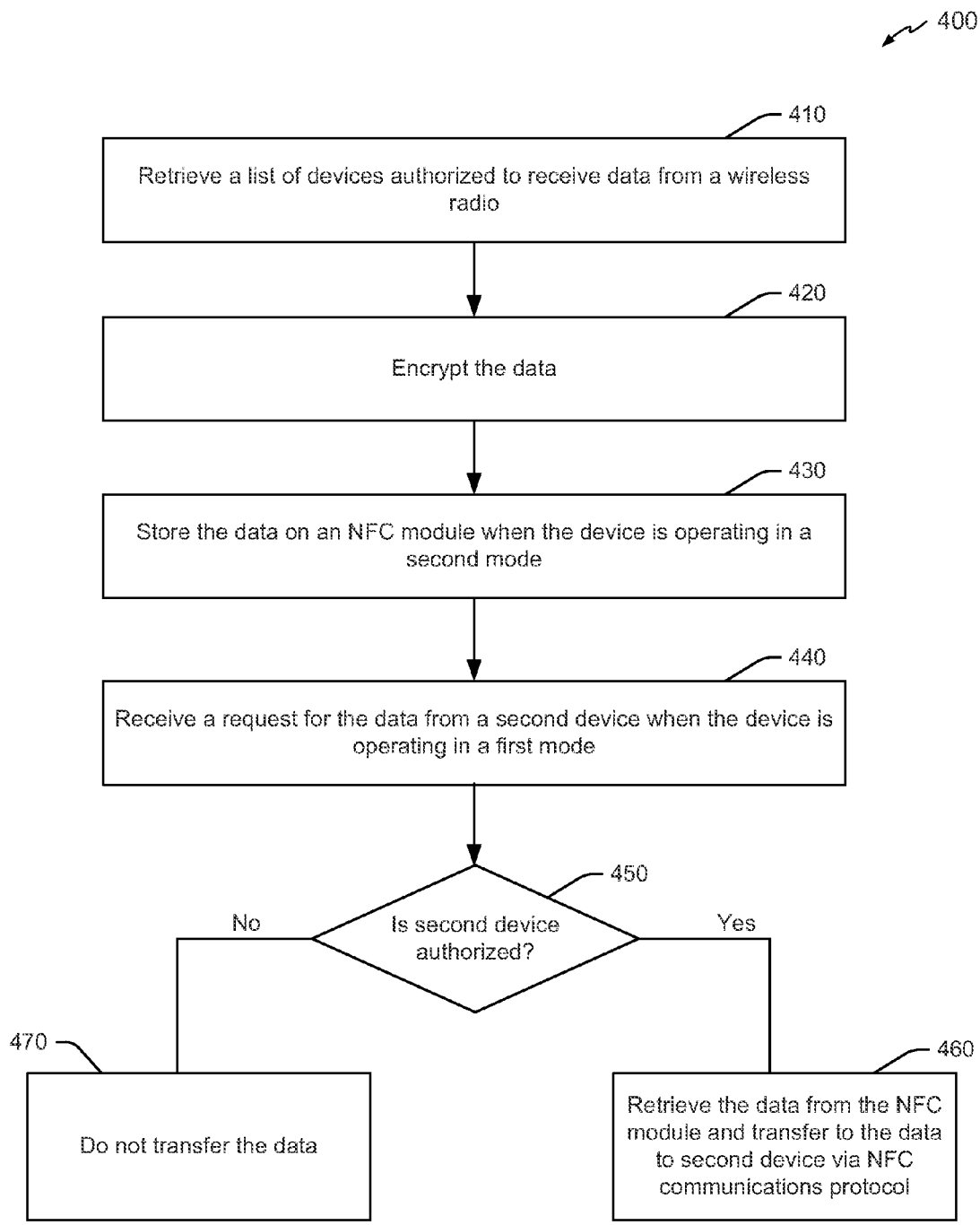
FIG. 4 is a flowchart of a method of securely transferring data, according to one example.

FIG. 4 is a flowchart of a method 400 of securely transferring data, according to one example. Although execution of method 400 is described below with reference to the components of device 102, other suitable components for execution of method 400 will be apparent to those of skill in the art. Additionally, the components for executing method 400 may be spread among multiple devices. Moreover, method 400 may be implemented in the form of executable instructions stored on a machine-readable storage medium, such as non-transitory machine-readable storage medium 510 of FIG. 5, and/or in the form of electronic circuitry.

Method 400 includes retrieving a list of devices authorized to receive data from a wireless radio, at 410. For example, the list of authorized devices 122 may be retrieved from wireless radio 210 and stored on NFC module 120. The list 122 may be generated by the wireless radio 210 while the device 102 is online. For example, a second device may be authorized to receive data 121 via a Bluetooth interface or via a wired connection between device 102 and the second device.

Method 400 includes encrypting the data, at 420, and storing the data on an NFC module when the device is operating in a second mode (i.e., an online mode), at 430. For example, data 121 may be encrypted prior to storing on the NFC module 120 to enhance security.

Method 400 includes receiving a request for the data from a second device when the device is operating in a first mode (i.e., an offline mode), at 440. For example, the second device may send a request for the data 121 to the device 102 while the device is in a sleep mode or powered off/down.

Method 400 includes determining whether the second device is authorized, at 450. If it is determined that the second device is authorized, method 400 includes retrieving the data from the NFC module and transferring the data to the second device via NFC communications protocol, at 460. If however, it is determined that the second device is not authorized, the data is not transferred, at 470.

Figure 5:
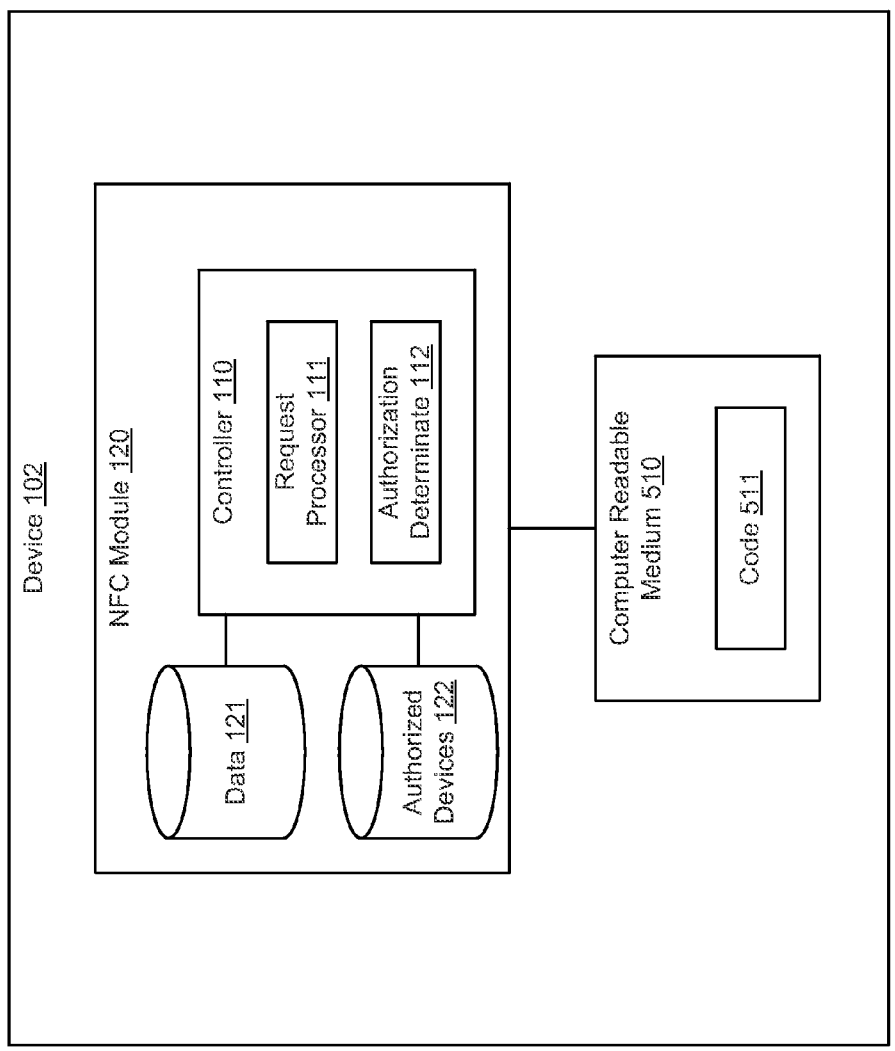
FIG. 5 is a block diagram of a device including a computer-readable storage medium to securely transfer data, according to one example.

FIG. 5 is a block diagram of a device including a non-transitory computer-readable storage medium encoded with instructions to securely transfer data, according to one example. Device 102 includes machine-readable storage medium 510. Machine-readable storage medium 510 includes code 511 that, when executed by controller 110, causes controller 110 to store data 121 and list 122 of authorized devices on NFC module 120.

The code 511 can also cause the controller 110 to receive a request for data 121 from a second device, when the device 102 is operating in a first mode, where power to the NFC module 120 is maintained in the first mode. Code 511 can also cause the controller 110 to determine whether the second device is authorized based on the list 122, and to transfer the data 121 from the NFC module 120 to the second device if it is determined that the second device is authorized.

The techniques described above may be embodied in a computer-readable medium for configuring a computing device to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory, nonvolatile memory storage media including semiconductor-based memory units such as FLASH memory, EEPROM, EPROM, ROM; ferromagnetic digital memories; volatile storage media including registers, buffers or caches, main memory RAM, etc; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present disclosure. However, it will be understood by those skilled in the art that the present disclosure may be practiced without these details. While the disclosure has been described with respect to a limited number of examples, those skilled in the art will appreciate numerous modifications and variations therefrom. It is intended that the appended claims cover such modifications and variations as fall within the true spirit and scope of the disclosure.

What is claimed is:

1. A device comprising:
a near field communication (NFC) module comprising a controller to:
store data and a list of devices authorized to receive the data;
receive a request for the data from a second device when the device is operating in a first mode;
transfer the data from the NFC module to the second device using NFC communications protocol based on a determination that the second device is an authorized device;
continue transfer of the data from a wireless radio of the device to the second device using wireless radio communications protocol, in response to the first device operating in a second mode; and
continue transfer the data to the second device using the NFC communications protocol, in response to the device switching back to the first mode, wherein the data is transferred from the NFC module to the second device, and
wherein the first mode includes at least one of a low power mode, a power off mode, and a sleep mode, and wherein the second mode includes an operational mode.

2. The device of claim 1, the wireless radio to:
authenticate the second device and add the second device to the list of authorized devices, when the device is operating in the second mode; and
provide the list of authorized devices to the NFC module.

3. The device of claim 1, comprising:
a power controller to control power to the wireless radio and the NFC module,
wherein power to the wireless radio is disabled when the device is operating in the first mode, and
wherein power to the NFC module is enabled when the device is operating in the first mode.

4. The device of claim 1, wherein the wireless radio comprises at least one of a Bluetooth radio, a wireless local area network (WLAN) radio, and a cellular radio.

5. The device of claim 1, wherein the second device is operating in at least one of the first mode and the second mode.

6. The device of claim 1, wherein the NFC communications protocol includes at least one of an active communication mode and a passive communication mode.

7. The device of claim 6, wherein in the passive communication mode, the second device supplies power to the NFC module to enable the data transfer.

8. The device of claim 1, wherein the device and the second device are connected via at least one of a wired connection and a wireless connection when the second device is authenticated and added to the list of authorized devices.

9. A method of securely transferring data, comprising:
storing data and a list of devices authorized to receive the data on a near field communication (NFC) module of a device;
maintaining power to the NFC module and disabling power to a wireless radio of the device when the device is operating in a first mode;
receiving a request for the data from a second device;
retrieving the data and transferring the data from the NFC module to the second device using NFC communications protocol responsive to determining that the second device is authorized;
transferring the data from the wireless radio of the device to the second device using wireless radio communications protocol, if the device begins operating in a second mode; and
transferring the data from the NFC module of the device to the second device, if the device switches to the first mode.

10. The method of claim 9, wherein the first mode comprises at least one of a power off mode, a low power mode, and a sleep mode, and wherein the second mode comprises an operational mode.

11. The method of claim 10, comprising storing the data and the list of authorized devices on the NFC module when the device is operating in the operational mode.

12. The method of claim 11, wherein the second device is pre-authorized by the wireless radio, and wherein the data and the list of authorized devices are retrieved from the wireless radio.

13. The method of claim 9, comprising encrypting the data prior to storing the data on the NFC module.

14. The method of claim 9, comprising:
receiving a second request for the data from a third device; and
denying access to the data responsive to determining that the third device is not authorized based on the list of authorized devices.

15. A non-transitory computer-readable storage medium comprising instructions that, when executed by a near field communication (NFC) module of a device, cause the NFC module to:
store data and a list of devices authorized to receive the data;
receive a request for the data from a second device when the device is operating in a first mode, wherein power to the NFC module is maintained when the device is operating in the first mode;
transfer the data from the NFC module to the second device via NFC communications protocol based on a determination that the second device is authorized;
transfer the data from a wireless radio of the device to the second device using wireless radio communications protocol, if the device is operating in a second mode; and
transfer the data from the NFC module of the device to the second device, if the device switches back to the first mode.

16. The non-transitory computer-readable storage medium of claim 15, the instructions further executable to:
receive a request for the data from a third device when the device is operating in the first mode; and
deny the request for the data to the third device based on a determination that the third device is not authorized.

17. The non-transitory computer-readable storage medium of claim 15, wherein the list of authorized devices is received from the wireless radio of the device when the device is operating in a second mode, wherein the second mode comprises an operational mode.

* * * * *

UNITED STATES PATENT AND TRADEMARK OFFICE
CERTIFICATE OF CORRECTION

| | | |
|---|---|---|
| PATENT NO. | : 9,055,393 B2 | Page 1 of 1 |
| APPLICATION NO. | : 13/857114 | |
| DATED | : June 9, 2015 | |
| INVENTOR(S) | : Puneet Kumar Arora et al. | |

It is certified that error appears in the above-identified patent and that said Letters Patent is hereby corrected as shown below:

Drawings:

In sheet 5 of 5, reference numeral 510, line 1, delete "Computer Readable" and insert -- Computer-Readable --, therefor.

Signed and Sealed this
Twenty-second Day of December, 2015

Michelle K. Lee
*Director of the United States Patent and Trademark Office*